US010302525B2

(12) United States Patent
Mebus

(10) Patent No.: US 10,302,525 B2
(45) Date of Patent: May 28, 2019

(54) TEST DEVICE FOR CARRYING OUT LOAD TEST ON A FLEXIBLE ELONGATED TEST OBJECT

(71) Applicant: INFICON GmbH, Cologne (DE)

(72) Inventor: Stefan Mebus, Cologne (DE)

(73) Assignee: INFICON GmbH, Cologne (DE)

( * ) Notice: Subject to any disclaimer, the term of this patent is extended or adjusted under 35 U.S.C. 154(b) by 71 days.

(21) Appl. No.: 15/324,533

(22) PCT Filed: Jul. 10, 2015

(86) PCT No.: PCT/EP2015/065811
§ 371 (c)(1),
(2) Date: Jan. 6, 2017

(87) PCT Pub. No.: WO2016/005555
PCT Pub. Date: Jan. 14, 2016

(65) Prior Publication Data

US 2017/0153162 A1 Jun. 1, 2017

(30) Foreign Application Priority Data

Jul. 10, 2014 (DE) ........................ 10 2014 213 426

(51) Int. Cl.
*G01M 13/02* (2019.01)
*G01M 5/00* (2006.01)

(52) U.S. Cl.
CPC ................................ *G01M 5/0025* (2013.01)

(58) Field of Classification Search
CPC ...... G01N 3/08; G01N 2203/028; G01N 3/32; G01N 29/4445; G01N 29/045; G01N 2291/262; G01N 3/56; G01N 2203/0023; G01N 3/567; B66C 15/00; B66D 1/54; G01R 31/08; G01M 13/023
See application file for complete search history.

(56) References Cited

U.S. PATENT DOCUMENTS 2,328,908 A * 9/1943 Kenyon .................. G01N 3/32 73/809
2,693,108 A * 11/1954 Eckhardt ............. B65H 59/225 242/153
4,403,499 A 9/1983 Sack et al.
5,509,320 A * 4/1996 Forster .................... B21C 51/00 324/237
8,931,350 B2 1/2015 Mupdende et al.
(Continued)

FOREIGN PATENT DOCUMENTS

DE 2036468 1/1972
DE 10120881 A1 10/2002
DE 102011018535 A1 10/2012

*Primary Examiner* — Lisa M Caputo
*Assistant Examiner* — Brandi N Hopkins
(74) *Attorney, Agent, or Firm* — The Webb Law Firm

(57) ABSTRACT

The invention relates to a test device for carrying out load tests on flexible, elongated test objects, including a first suspension which is movably guided along a closed circulating path for a first end of the test object, a drive for moving the first suspension along the path, a second suspension for fastening another end of the test object, and a mass body that can be attached to the test object between the two suspensions in such a manner that the mass body is movable along the test object.

8 Claims, 1 Drawing Sheet

18
26
12
15
28
20
24
30
22
34
32
14
16

(56) References Cited

U.S. PATENT DOCUMENTS

| | | | | |
|---|---|---|---|---|
| 2008/0006097 | A1* | 1/2008 | Stauffer | G01M 13/023 73/862.453 |
| 2014/0109682 | A1* | 4/2014 | Mupdende | G01N 3/08 73/812 |

* cited by examiner

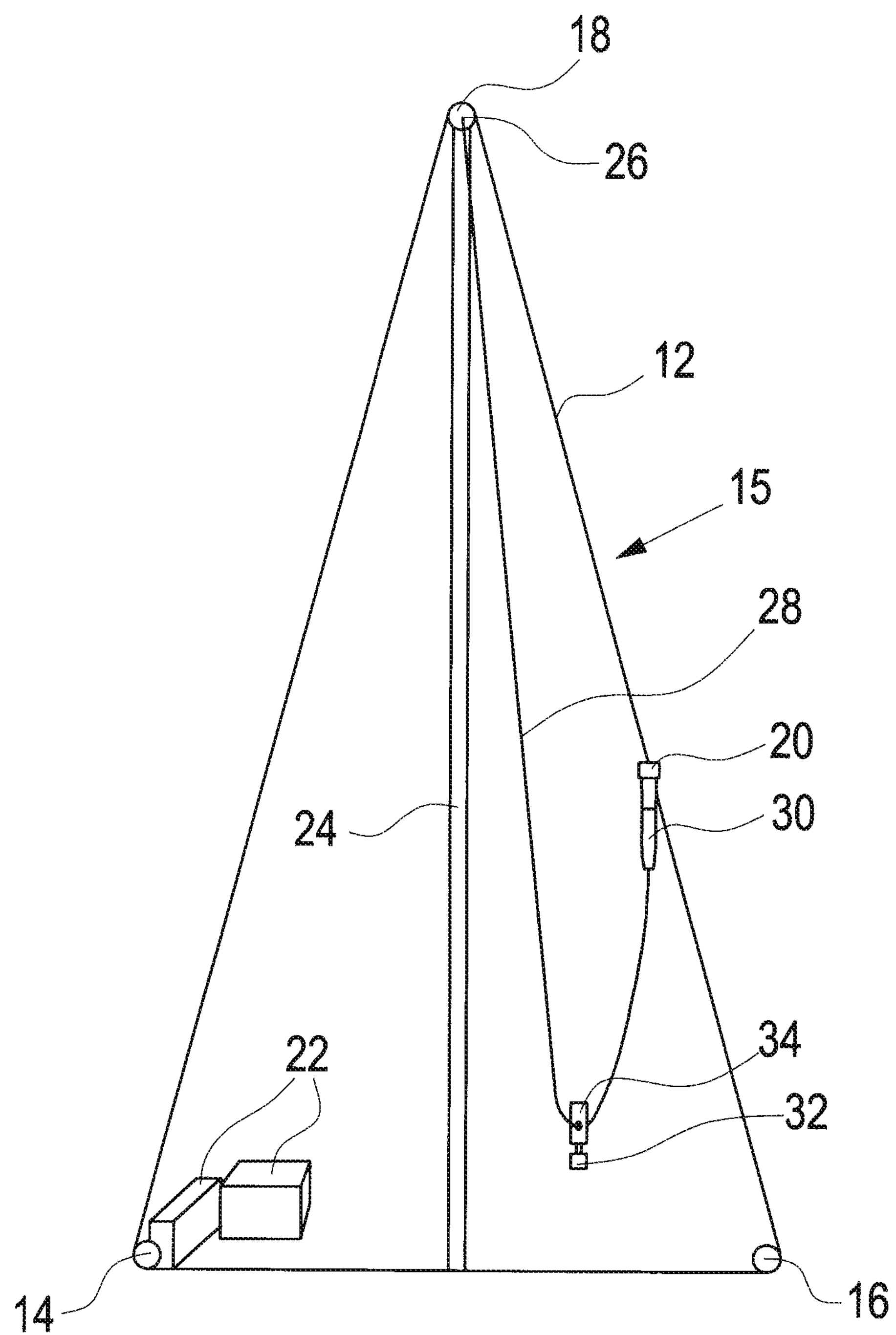
18
26
12
15
28
20
30
24
34
22
32
14
16

TEST DEVICE FOR CARRYING OUT LOAD TEST ON A FLEXIBLE ELONGATED TEST OBJECT

CROSS-REFERENCE TO RELATED APPLICATIONS

This application is the United States national phase of International Application No. PCT/EP2015/065811 filed Jul. 10, 2015, and claims priority to German Patent Application No. 10 2014 213 426.9 filed Jul. 10, 2014, the disclosures of which are hereby incorporated in their entirety by reference.

BACKGROUND OF THE INVENTION

Field of the Invention

The invention relates to a test device for carrying out load tests on flexible elongated test objects such as e.g. cables and tubes.

Description of Related Art

Such load tests are of particular importance for multi-functional cables or for conduits that have to fulfill safety-relevant requirements, such as e.g. sniffer conduits of leak detectors. Sniffer conduits connect a sniffer probe to a leak detector so that, for leak detection, the sniffer probe can be guided by hand whereas the leak detector is arranged in a stationary position. Damage of the sniffer conduit by wear or by breakage of the sniffer conduit may lead to a wrong measurement result. A safety risk may occur if, due to a defect sniffer conduit, an existing leak will not be detected.

For testing the stress resistance of a cable, it is known to perform drag chain tests and torsion tests which, however, do not reproduce the typical stresses that occur particularly in sniffer conduits and cables of hand-guided sniffer probes for leak detection.

SUMMARY OF THE INVENTION

It is an object of the invention to provide an improved test device for carrying out load tests on flexible elongated test objects.

The elongated test object, which can be a cable, a tube, a belt, a chain, a sniffer conduit of a hand-guided leak detection device or a multifunctional cable, will be fastened on two suspensions of the test device. Of these two suspensions, at least a first suspension is guided along a circulating path. A drive is operative to drive the first suspension along said path. The second suspension can be provided to be stationary or to be movable as well. It is decisive that the test object will be fastened to the two suspensions in such a manner that the length of the test object is longer than the direct distance between the two suspensions. Thereby, due to its flexibility and due to the gravitational pull, the test object is sagging downward.

The test device further comprises a mass body which, along the test object, is adapted to be attached to the test object in a movable manner. In the region of the mass body, the mass body will pull the test object downward under the effect of the gravitational pulling force. When, now, the first suspension is being driven in a circulating manner along said path, the mass body will move along the test object and, accordingly, that portion of the test body that is pulled downward by the mass body will be changing continuously. In this manner, there is created a mass-loaded bending site that is continuously shifting in position along the test object. It will thus be possible to test the test object for tensile strength and bending endurance by way of a continuous test.

The circulating path can be realized by a flexible ring element guided via deflection rollers, wherein said flexible ring element has the first suspension attached to it. The flexible ring element can be a chain, a belt, a cable, a tape, a tube and the like. At least three deflection rollers should be arranged at different heights so that the first suspension, while circulating along the path, will change its height. For instance, a number of three deflection rollers can be provided wherein one deflection roller among them is arranged in an upper apex. In the region of the upper apex, the second suspension can be arranged in a stationary position. The two other deflection rollers can be arranged e.g. at the same height below the uppermost deflection roller. The path will in this case have a substantially triangular shape.

The path can be configured for circulating movement exclusively in a vertical plane. Concerning the deflection rollers, these are then arranged in a vertical plane. At least, the path should be guided in a plane which relative to a vertical plane is tilted by maximally 45° and preferably maximally 10°. Thereby, the first suspension will substantially perform an upward and downward movement. If the second suspension is arranged in a stationary position in the region of the upper deflection roller, the first suspension will be moved not only upward and downward but, in relation to the second suspension, also back and forth in the horizontal direction. This will result in the occurrence of typical stresses on cables or conduits connected to hand-guided devices such as e.g. to sniffer conduits of a hand-guided sniffer probe of a leak detector.

The mass body is preferably provided with a carriage or a roller so as to be movably connected to the test object in a manner allowing it to slide or roll along the test object. Depending on the type of the test object, the mass body should have a weight of at least 50% of the weight of the test object. The mass body shall distinctly reduce the bending radius of the test object in the sagging region. In this regard, a bending radius of about 10 cm is desirable, which is achievable by a mass of about 0.5 kg.

The path should be designed to the effect that the first suspension during its circulating travel will overcome a height difference of at least two meters and preferably about three meters. A suitable height difference can be in the range from 2.50 meters to 3.50 meters, wherein the distance overcome by the first suspension in the horizontal direction during the circulating travel should be about half of the height difference, i.e. about 1.25 meters to 1.75 meters, and preferably said distance is about 1.50 meters. This will result in an additional torsional movement of the test object.

The drive of the test device can drive one of the deflection rollers directly. The deflection rollers can be designed as toothed wheels and drive a toothed belt or a chain.

BRIEF DESCRIPTION OF THE DRAWING

FIG. 1 shows a schematic view of the test device in accordance with an exemplary embodiment of the invention.

DETAILED DESCRIPTION

A roller chain 12 is designed as a closed flexible ring and is guided via three deflection rollers 14,16,18. Said chain 12 has a first suspension 20 attached to it. The deflection rollers 14,16,18 are arranged at the vertices of an isosceles triangle, wherein the two lower deflection rollers 14,16 are situated at the same height and the upper deflection roller 18 is situated about 2.95 meters above the two lower deflection rollers 14,16. The two lower deflection rollers 14,16 are arranged at mutual distance of about 1.45 meters. Lower deflection roller 14, which in FIG. 1 is the left-hand roller, is electrically driven by an electric drive 22 and, when the drive 22 causes said deflection roller 14 to rotate, the deflection roller 14 will move the chain 12 along path 15 in the form of an isosceles triangle with rounded corners. The first suspension 20 will then be moved in a circulating manner along path 15. In the process, the first suspension 20 will perform an upward and downward movement with a height difference of about 2.95 meters and a back-and-forth movement relative to the upper deflection roller 18 of about 1.45 meters.

In the region of the upper deflection roller 18, which roller is fastened to a vertical support 24, also a second suspension 26 is fastened to said support 24 in a stationary position.

The two suspensions 20,26 serve for taking up a flexible elongated test object 28 which is the sniffer conduit of a hand-guided sniffer probe of a leak detector. One end of test object 28—notably the handle 30 of the leak detector—is hooked into place on the first suspension 20. Herein, the first suspension 20 is designed to be pivotable so that, during the upward and downward movement and during the back-and-forth movement, the test object 28 will—under effect of gravity—always be suspended from the first suspension 20 in vertically downward direction.

Another end of the test object 28 that can be a random part of the sniffer conduit, is hooked into the second suspension 26 in a stationary position. In this arrangement, the test object 28 is hooked into the two suspensions 20,26 in such a manner that the length of the test object 28 between the two suspensions 20,26 is larger than the maximal distance of the two suspensions 20,26 during circulation along path 15.

In the lower vertex of test object 28, a mass body 32 is suspended. Said mass body comprises a roller 34 which is formed with a hollow profile so as to rest on test object 28 and be held on test object 28.

While the first suspension 20 is being guided along path 15 in the shape of an isosceles triangle with rounded corners, the lower vertex of the test object 28 that has the mass body 32 hooked into it, will be changing in accordance with the respective height position of the first suspension 20. In the process, said roller 34 will roll along the test object 28 and transmit the weight force of mass body 32 onto the test object 28. The diameter of roller 34 should be at least 5 cm and maximally about 15 cm (preferably about 10 cm) for effecting a suitable bending deformation of the test object 28 in its lower vertex without kinking the test object 28.

The test device according to the invention is adapted and configured to perform stress tests in the form of continuous tests on flexible elongated test objects 28 and to detect wear-related deficiencies of the test object 28.

The invention claimed is:

1. A test device for carrying out load tests on flexible elongated test objects having a first end opposing a second end, comprising:

a first suspension which is movably guided upward, downward, back, and forth along a closed, circulating path, and provided for carrying said first end of the test object, a drive for moving the first suspension along the path, a second suspension for fastening said second end of the test object, and a mass body that can be attached to the test object between the two suspensions such that the mass body is moved along the test object upon moving said first suspension along said closed, circulating path.

2. The test device according to claim 1, wherein the path is formed by a chain guided via deflection rollers or by a belt guided via deflection rollers.

3. The test device according to claim 2, wherein the chain or the belt is guided via at least three deflection rollers in a vertical plane.

4. The test device according to claim 1, wherein the path is arranged to guide the first suspension upward and downward in vertical direction during circulation.

5. The test device according to claim 1, wherein the mass body is provided with a roller to be suspended on the test object such that, during the circulation of the first suspension, the roller rolls along the test object.

6. The test device according to claim 1, wherein the second suspension is provided in a region of a highest deflection point of the closed, circulating path of the first suspension.

7. The test device according to claim 1, wherein the test object is a cable or a tube.

8. The test device according to claim 1, wherein the first suspension is adapted to be fixedly connected to the path and is designed for pivotal reception of the test object.

* * * * *